United States Patent
Su et al.

(10) Patent No.: US 11,177,080 B2
(45) Date of Patent: Nov. 16, 2021

(54) CONDUCTIVE POLYMER HYBRID TYPE ELECTROLYTIC CAPACITOR

(71) Applicant: KUAN KUN ELECTRONIC ENTERPRISE CO., LTD., New Taipei (TW)

(72) Inventors: Chia He Su, Dong Guan (CN); Koji Okuyama, Dong Guan (CN)

(73) Assignee: KUAN KUN ELECTRONIC ENTERPRISE CO., LTD., New Taipei (TW)

( * ) Notice: Subject to any disclaimer, the term of this patent is extended or adjusted under 35 U.S.C. 154(b) by 0 days.

(21) Appl. No.: 17/071,288

(22) Filed: Oct. 15, 2020

(65) Prior Publication Data

US 2021/0118627 A1    Apr. 22, 2021

(30) Foreign Application Priority Data

Oct. 17, 2019    (JP) .............................. JP2019-190226

(51) Int. Cl.
| | |
|---|---|
| H01G 11/60 | (2013.01) |
| H01G 11/62 | (2013.01) |
| H01G 11/04 | (2013.01) |
| H01G 11/30 | (2013.01) |
| H01G 11/24 | (2013.01) |

(52) U.S. Cl.
CPC ............ *H01G 11/60* (2013.01); *H01G 11/04* (2013.01); *H01G 11/24* (2013.01); *H01G 11/30* (2013.01); *H01G 11/62* (2013.01)

(58) Field of Classification Search
CPC ........ H01G 11/60; H01G 11/04; H01G 11/24; H01G 11/30; H01G 11/62
See application file for complete search history.

(56) References Cited

U.S. PATENT DOCUMENTS

| | | | |
|---|---|---|---|
| 4,652,968 A | 3/1987 | Shimamoto et al. | |
| 9,208,954 B2 * | 12/2015 | Matsuura | ............... H01G 9/145 |
| 9,589,734 B2 | 3/2017 | Koseki et al. | |
| 10,431,390 B2 | 10/2019 | Tsubaki et al. | |
| 10,535,472 B2 | 1/2020 | Tsubaki et al. | |

(Continued)

FOREIGN PATENT DOCUMENTS

| | | |
|---|---|---|
| JP | S62-009618 A | 1/1987 |
| JP | H08-227827 A | 9/1996 |

(Continued)

*Primary Examiner* — Dion R. Ferguson
(74) *Attorney, Agent, or Firm* — Manabu Kanesaka

(57) ABSTRACT

A conductive polymer hybrid aluminum electrolytic capacitor having a high withstand voltage with a rated voltage of 63 V or higher, high heat resistance to high temperature reflow solder, and durability and reliability under high temperature environment with 125° C. or higher is provided. In a conductive polymer hybrid aluminum electrolytic capacitor having an electrolytic solution and a cathode with conductive polymer, the electrolytic solution contains a solute and a solvent, the solvent contains diethylene glycol and/or triethylene glycol as a main component, the solute contains a long-chain dibasic carboxylic acid with 12 or more carbon atoms and an amine with a high boiling point, and the electrolytic solution is contained in a space of the capacitor element to which a solid electrolytic layer by conductive polymer is formed.

6 Claims, 1 Drawing Sheet

(56) References Cited

U.S. PATENT DOCUMENTS

| | | | |
|---|---|---|---|
| 10,563,318 B2* | 2/2020 | Tsubaki | H01G 9/055 |
| 2012/0300368 A1* | 11/2012 | Matsuura | H01G 9/035 |
| | | | 361/506 |
| 2018/0218844 A1* | 8/2018 | Sato | H01G 9/028 |

FOREIGN PATENT DOCUMENTS

| | | |
|---|---|---|
| JP | 2014-072465 A | 4/2014 |
| JP | 2016-015365 A | 1/2016 |
| JP | 2018-061033 A | 4/2018 |
| JP | 2018-74046 A | 5/2018 |
| JP | 2018-174233 A | 11/2018 |
| WO | 2014/021333 A1 | 2/2014 |
| WO | 2017/056447 A1 | 4/2017 |

* cited by examiner

CONDUCTIVE POLYMER HYBRID TYPE ELECTROLYTIC CAPACITOR

BACKGROUND OF THE INVENTION

Technical Field

The present invention relates to an electrolytic solution used in a conductive polymer hybrid electrolytic capacitor, and to a composition of an electrolytic solution used in a conductive polymer hybrid aluminum electrolytic capacitor which has remarkably higher thermal stability and reliability at a high rated voltage of 63 V or higher when compared to a case in which the same conductive polymer is used, that is, it relates to a composition of electrolytic solution used for a conductive polymer hybrid electrolyte capacitor which has a small change in characteristics from initial characteristics even when used at a high temperature for a long period of time. More particularly, the present invention relates to an electrolytic solution which makes it possible to produce a conductive polymer hybrid aluminum electrolytic capacitor which has lead-free reflow heat resistance and both durability at a high temperature higher than 125° C. and high withstand voltage characteristics of 63 V or higher and can be used over a wide rated voltage range spanning from 63 V to 200 V while maintaining features such as a low ESR, a high ripple and a high capacitance, a conductive polymer hybrid aluminum electrolytic capacitor containing the electrolytic solution, and a method of producing the conductive polymer hybrid aluminum electrolytic capacitor.

Related Art

A conductive polymer hybrid aluminum electrolytic capacitor contains, as a cathode component, both a conductive polymer (first cathode) which forms a solid electrolyte layer having electron conductivity and an electrolytic solution (second cathode) having ion conductivity. In the conductive polymer hybrid aluminum electrolytic capacitor, basic electrical characteristics, that is, a low electrical resistance (equivalent series resistance (ESR)) equivalent to that of a solid electrolytic capacitor over a wide temperature range spanning from a low temperature to a high temperature, resistance to a high ripple, and initial characteristics of capacitance are determined by characteristics of the conductive polymer which is the first cathode and a method of forming a capacitor element.

As for the method of forming a cathode comprising a conductive polymer, a method has been developed recently in which a capacitor element is immersed using an aqueous dispersion of high purity particles of a conductive polymer to allow the conductive polymer particles to penetrate into a deep part of the element by a depressurization and pressurization operation, followed by drying to form a solid electrolyte layer, and it has thus become possible to form a cathode with few impurities and high stability. An example of a preferred polymer dispersion can include poly(3,4-ethylenedioxythiophene) (PEDOT) doped with polystyrene sulfonic acid (PSS), that is, PEDOT/PSS.

In the conductive polymer hybrid aluminum electrolytic capacitor, the electrolytic solution which serves as the second cathode plays a decisive role in ensuring stability and long-term reliability of a capacitor while maintaining basic electrical characteristics determined by the solid electrolyte layer formed of the conductive polymer. In case of a solid capacitor in which only a conductive polymer, which is a solid electrolyte, is used for a cathode, it has a weak function of repairing defects in dielectric of an aluminum electrode caused by a thermal impact or mechanical stress in a high temperature reflow soldering process or a high temperature and low temperature environment, and as a result, there is a risk of a sharp increase in a leakage current, and in the worst case, an accidental short circuit failure. In particular, the higher the rated voltage, the higher the probability of an accidental failure, which hinders a practical application in a power supply circuit of 63 V or higher. In case of a conductive polymer hybrid aluminum electrolytic capacitor containing the electrolytic solution, it has a higher speed of repairing defects in the dielectric by the electrolytic solution and a smaller increase in leakage current even under thermal impacts and mechanical stresses in the high-temperature reflow soldering process or in high temperature and low temperature environments, making it possible to increase the rated voltage, and as a result, recently, demands for applications such as in-vehicle equipment or communication circuits which require a high withstand voltage are rapidly increasing.

The role of an electrolytic solution in the conductive polymer hybrid aluminum electrolytic capacitor has been known to be deeply related to not only repairability of the aforementioned defect in the dielectric characteristics, but also to the stability under a heated condition of the conductive polymer layer, heat resistance during the reflow soldering process, reliability such as durability under continuous use at a high temperature, and further to withstand voltage characteristics of the capacitor, and the performance of a conductive polymer hybrid aluminum electrolytic capacitor changes depending on the combination of the electrolytic solution and the conductive polymer. Many prior art and patents for improving the electrolytic solution are known.

The electrolytic solution comprises an ionic solute having a high electric conductivity and a relatively low viscous organic solvent which dissolves the ionic solute and which facilitates its penetration into the electrode of the capacitor. Representative solvents may be found in ethylene glycol, γ-butyrolactone, and sulfonic compounds.

Ethylene glycol has a hydroxyl group and is known as a solvent which easily dissolves amine that is present in a solute, and which provides an increase in conductivity of the electrolytic solution (low ESR) and provides a high spark voltage (withstand voltage). In addition, ethylene glycol is known to have good compatibility with conductive polymers and dielectric aluminum oxide. On the other hand, in the case of ethylene glycol, the problem has been known that it is susceptible to degradation by oxidation when heated as well as to occurrence of short circuit during the reliability test (hightemperature life test), and in particular, additional problem has been known that a vapor pressure is sharply increased during the lead-free reflow soldering process at 250° C. or higher, causing occurrence of capacitor's swelling. γ-butyrolactone has a low viscosity when it is in a liquid state at a low temperature and has an excellent characteristic, but has a drawback that its transpiration through a sealing rubber is high at a high temperature its durability is poor. Sulfolane is known to exhibit such characteristics as repairing the dielectric layer by the electrolytic solution, contributing to the reduction of leakage current, and it has a high boiling point, and it suppresses the evaporation of electrolytic solution, and it has an excellent property at a high temperature; however, sulfolane has problems that it exhibits inferior characteristics at a low temperature, and furthermore, it is a rather expensive solvent, leading to an increase in the production cost. Therefore, these solvents are rarely used alone, and instead a solvent mixture, which compensates the advantage and disadvantage of each solvent, constitutes the basic composition of the electrolytic solution of conductive polymer hybrid aluminum electrolytic capacitors.

Another component, which forms part of the electrolytic solution is a solute. The solute comprises a salt of an organic acid and a base. Representative example of the organic acid includes such as an organic carboxylic acid and a borodisalicylic acid, and for the basic component, such as ammonium or amine compounds of from primary to tertiary type, quaternary amidinium compounds, and quaternary ammonium compounds are known, and a wide variety of combinations of these organic acids and bases are used depending on a purpose.

A capacitor element, in which a solid electrolyte layer of a conductive polymer is formed, is impregnated with an electrolytic solution, and then, is inserted into a case which is cylindrical in shape having a bottom, followed by being sealed with rubber, such as butyl rubber, which has a high elastic modulus and a high strength, thereby to form a conductive polymer hybrid aluminum electrolytic capacitor.

The basic characteristics of the conductive polymer hybrid aluminum electrolytic capacitor are evaluated by the basic electrical characteristics, such as the rated voltage (maximum voltage that can be continuously applied), capacitance, equivalent series resistance (ESR), ripple current standard, and impedance standard, as well as the dependency on temperature or circuit frequency and the category upper limit temperature (maximum temperature that can be continuously used) and the durability at a high temperature (the high temperature reliability). Among them, the rated voltage is determined by the foil withstand voltage (withstand voltage) of the aluminum anode foil and the spark voltage of the electrolytic solution. In addition, the category upper limit temperature is determined by the heat resistance stability of the electrolytic solution and the heat resistance of the conductive polymer, and the heat resistance or durability as well as the high temperature reliability during the lead-free reflow soldering process under a high temperature are determined by the combination of factors, such as volatility of the electrolytic solution through the sealing rubber, the heat resistance of conductive polymers, and the interaction caused by the combination of the electrolytic solution and the conductive polymer.

The present invention relates to the composition of an electrolytic solution used in a conductive polymer hybrid aluminum electrolytic capacitor Which has a remarkably high thermal stability and reliability, i.e., small change from the initial characteristics even after use for a long time at a high temperature, when compared with the case in which the same conductive polymer is used at a rated voltage higher than or equal to 63 V.

Until now, the use of conductive polymer hybrid aluminum electrolytic capacitors has been centered around in the field of power supplies of an in-vehicle circuit having a nominal voltage of 12 V or a relatively low voltage circuit, and the rated voltages of the capacitor were mainly 25 V and 35 V. However, recent years have found an increase in the demand for a conductive polymer hybrid aluminum electrolytic capacitor to be used in a 48 V power supply circuit to be mounted in a mild hybrid system of cars and communication base stations or the like, and in the case where a voltage margin is needed to be increased when the rated voltage required for the capacitor is set to 63 V or higher, a rating of 100 V is required more often than not. In addition, the need is growing for not only high withstand voltage but also for low ESR (down to a low temperature), high capacitance, high heat resistance, and high reliability (durability). It is hard to say that the basic technology has been established for conductive polymer hybrid aluminum electrolytic capacitors capable of realizing the balance of these characteristics, in particular, the simultaneous realization of both high withstand voltage, high heat resistance and durability (high reliability).

Furthermore, recently, these fields of application have encountered an increase in the ratio of surface mounting even when conductive polymer hybrid aluminum capacitors to increase the productivity and the lead-free reflow heat resistance has become strongly required. In a hitherto conventional reflow process, a maximum temperature of lower than 250° C. is accepted, but recently, increasing number of incidences where extremely severe conditions are encountered in which a high temperature profile of 260° C. for 5 seconds (+230° C. for 40 seconds) in accordance with JEDEC and the number of times of reflow being 2 or more is required.

All of those conventional technologies relating to conductive polymer hybrid aluminum electrolytic capacitors (WO 2014/021333 A and WO 2017/056447 A) are directed to improvement of the electrolytic solution in which ethylene glycol is used as the main solvent. WO 2014/021333 A discloses a technology directed to a conductive polymer hybrid aluminum electrolytic capacitor having a high withstand voltage, which can prevent deterioration of withstand voltage characteristics, where the deterioration is caused by a lead-free reflow or the like and where the prevention is provided by an electrolytic solution comprising a specific solute and a solvent mixture of ethylene glycol and γ-butyrolactone. WO 2017/056447 A discloses a conductive polymer hybrid aluminum electrolytic capacitor which uses an electrolytic solution comprising ethylene glycol as the main solvent and which contains, as the main component, primary aromatic compound having a hydroxyl group in the acid component of the solute, where the conductive polymer hybrid aluminum electrolytic capacitor has a high heat resistance and a high withstand voltage and which is capable of maintaining a low ESR. JP 2018-74046 A is an invention directed to a conductive polymer hybrid aluminum electrolytic capacitor Which uses an electrolytic solution comprising a solvent mixture of glycol compound such as ethylene glycol and sulfolane and a general solute such as triethylamine phthalate, where the conductive polymer hybrid aluminum electrolytic capacitor has a low leakage of current, and which is capable of maintaining a low ESR. In WO 2014/021333 A, WO 2017/056447 A, and JP 2018-74046 A, Improvements are tried with respect to capacitors whose rated voltage is up to 63 V, but there is reported no improvement case where the rated voltage is 80 V or higher. In JP 2018-74046 A, an improvement, where the rated voltage is 100 V, is provided, but it is a modification at a category upper limit temperature of 125° C., and there is no description of hightemperature reflow soldering heat resistance.

In addition, the reflow soldering heat resistance (10 ϕ) of a conductive polymer hybrid aluminum electrolytic capacitors with a rated voltage of 63 V or higher, which are actually mass-produced have a temperature profile of 245° C. for 5 seconds (+230° C. for 40 seconds) at most and the maximum number of times of reflow is generally 2. The number of times of reflow is generally limited to one when a maximum temperature is 260° C. for 5 seconds. In addition, the relationship between the category upper limit temperature and the maximum rated voltage is 125 V at 105°

C. and 125° C., 63 V at 135° C., and 63 V at 150° C., and the levels of high withstand voltage and high heat resistance are not sufficient.

SUMMARY OF THE INVENTION

An object of the present invention is to provide an electrolytic solution usable in a conductive polymer hybrid aluminum electrolytic capacitor which satisfies the market requirement regarding the reflow soldering heat resistance even at a high voltage rating of 63 or 80 V or higher in accordance with the change in market demand and which withstands a high temperature in use where the category upper limit temperature is higher than 125° C. Ethylene glycol, which is generally used, has a hydroxyl group and easily dissolves an amine salt present in the solute, and provides effect of increasing conductivity [low ESR] and spark voltage (withstand voltage) of the electrolytic solution, and has been used as a solvent which reduces the initial ESR and which is suitable for a high voltage rating of the capacitor, and also as the main solvent constituting part of the electrolytic solution of the conductive polymer hybrid aluminum electrolytic capacitor as described in the prior art patent documents. However, according to experimental results obtained by the inventors, it is confirmed that in a conductive polymer hybrid structure falling within the high withstand voltage range in which the rated voltage is 63 V or higher, a withstand voltage is greatly reduced and the stability at high temperature such as 135° C. is insufficient, and thus, the durability during a high-temperature use is not always satisfactory. This implies the relationship with the problem hitherto pointed out in the related art that it is easily susceptible to degradation by oxidation when subjected to heat and also to a short circuit which occurs during reliability testing (a high-temperature life testing). In addition, the lead-free reflow soldering process at 250° C. or higher entails a rapid increase in the vapor pressure, which causes the capacitor to swell and makes it susceptible to decrease in the solderability, and as a result, it cannot meet the requirement of soldering heat resistance during the reflow process which requires a much higher temperature in recent years.

The inventors found for the first time, after an extensive and thorough review of the solvents and solutes, that when a specific solvent which is a constituent element of an electrolytic solution and a specific solute are combined, a phenomenon, in which a specifically remarkable effect such as heat resistance and long-term reliability at a high temperature are exhibited while the initial characteristics, such as a high withstand voltage and a low ESR, of a conductive polymer hybrid capacitor is maintained, and based on these findings, completed the present invention.

Specifically, as for the solvent, the present inventors extensively searched for a polyhydric alcohol which is expected to have the effect of increasing the conductivity (low ESR) and the similar effect of increasing the spark voltage (withstand voltage) by ethylene glycol as a glycol compound which has a hydroxyl group and which is expected to lead to improvement of the stability of a conductive polymer which provides heat resistance and durability at a high rated voltage of 63 V or higher, and the present inventors found that diethylene glycol or triethylene glycol, which is obtained by dehydration condensation of two or three molecules of ethylene glycol, is preferred as the solvent having excellent heat resistance and withstand voltage instead of ethylene glycol to be used as a solvent component constituting part of the electrolytic solution of the present invention, and found for the first time that only the electrolytic solution obtained by combining these solvent with a specific solute composition makes it possible to manufacture capacitors which provide a remarkable effect, such as high withstand voltage characteristics and high heat resistance (high-temperature reflow soldering heat resistance and high-temperature durability) that could not have been achieved by the prior art, thereby completing the present invention based on these findings.

That is, according to a first invention, a conductive polymer hybrid aluminum electrolytic capacitor having a capacitor element formed by winding an anode foil having an aluminum dielectric oxide film formed thereon and a cathode foil, with a separator interposed therebetween, the conductive polymer hybrid aluminum electrolytic capacitor comprising:

a conductive polymer layer formed on the dielectric oxide film and an electrolytic solution, wherein the electrolytic solution contains a solute and a solvent, the solvent containing diethylene glycol and/or triethylene glycol and additionally, as a second solvent, γ-butyrolactone alone or a solvent mixture comprising γ-butyrolactone and sulfolane, wherein the content of diethylene glycol and/or triethylene glycol is 30 to 90 wt % with respect to the entire solvent, with the remaining balance being γ-butyrolactone alone or a solvent mixture comprising γ-butyrolactone and sulfolane, and wherein the solute contains a salt of a long-chain dibasic carboxylic acid (dicarboxylic acid) with 12 or more carbons and an amine with a boiling point of 150° C. or higher.

In the conductive polymer hybrid aluminum electrolytic capacitor of the first invention, according to a second invention, the content of diethylene glycol and/or triethylene glycol and additional γ-butyrolactone as the second solvent, in the solvent is in a range of 45 wt % to 80 wt %;

wherein a total content of diethylene glycol and/or triethylene glycol and γ-butyrolactone is 80 wt % or more; and wherein a content of γ-butyrolactone is 20 wt % to 55 wt %.

In the conductive polymer hybrid aluminum electrolytic capacitor of the first invention, according to a third invention, the solute contains a long-chain dibasic carboxylic acid with 12 and more carbons and an amine with a boiling point of 150° C. or higher.

In the conductive polymer hybrid aluminum electrolytic capacitor of the first invention, according to a fourth invention, the capacitor has a rated voltage in a range of 63 V to 200 V and a maximum guaranteed operating temperature of 105° C. or higher.

In the conductive polymer hybrid aluminum electrolytic capacitor of the first invention, according to a fifth invention, the capacitor has a rated voltage in a range of 63 V to 200 V and a maximum guaranteed operating temperature of 125° C. or higher.

In the conductive polymer hybrid aluminum electrolytic capacitor of the first invention, according to a sixth invention, the capacitor has a rated voltage in a range of 63 V to 200 V and a maximum guaranteed operating temperature of 135° C. or higher.

The present inventors could not find similar effect when a series of propylene glycols, such as tetraethylene glycol and pentaethylene glycol which have a large molecular weight, or dipropylene glycol which contains a propylene group, or polyhydric alcohols, such as glycerin, are used, other than the foregoing glycols. If an inference is made under the condition that it does not affect the scope of the present invention, it is inferred that the difference in the length of the main chain of molecule and the structure of side chains results in desirable effect on the compatibility and the interaction and stabilization of the components at a high temperature and the desirable effect is due to the most desirable molecular structure provided by diethylene glycol or triethylene glycol.

In addition, the specific solute in the present invention means the solute which contains an amine salt of dibasic long-chain dicarboxylic acid and a specific carboxylic acid containing, at an appropriate ratio, amine having the heat resistant temperature (obliging point) of 150° C. or higher, where the amine salt constitutes the carboxylic amine salt used in the present invention. It was clarified by a series of experiments conducted by the present inventors that such solute provides remarkable effect that specifically excellent withstand voltage and long-term durability (reliability) during use at a high temperature in the case of the electrolytic solution in which diethylene glycol or triethylene glycol is used as the solvent in the capacitor having a high rated voltage when compared to the case where other solute is used, and such effect is not obtainable in the case of an electrolytic solution which contains a solvent mixture obtained by mixing ethylene glycol, as a solvent, with γ-butyrolactone and sulfolane, which are other known solvent.

That is, the highly reliable conductive polymer hybrid aluminum electrolytic capacitor of the present invention, which has high withstand voltage and high heat resistance, is obtained by a method in which a capacitor element, which is obtained by winding an anode foil and a cathode foil both formed of high-purity aluminum with an electrolytic paper interposed therebetween, is immersed in an aqueous dispersion containing high-purity fine particles of a conductive polymer, followed by impregnating the capacitor element with the aqueous dispersion down to the central portion of the capacitor element by pressurization or depressurization and thereafter drying the capacitor element, thereby forming a cathode layer of conductive polymer, and then, the void portion within the capacitor is impregnated with the electrolyte solution which contains a solvent mixture comprising diethylene glycol and/or triethylene glycol, as the main solvent, and γ-butyrolactone and sulfolane, which are used as a second or third solvent, and a salt formed by dibasic long-chain carboxylic acid having 12 or more carbons and amine having the boiling point of 150° or higher. As for the second or third solvent, γ-butyrolactone is particularly preferred. Addition of γ-butyrolactone having low viscosity over a wide temperature range spanning from a low temperature reduces the viscosity of glycols which have usually higher viscosity and increases the solubility of the solute, thereby providing an electrolytic solution which provides excellent characteristics of impregnation into a capacitor element. In addition, sulfolane has heat resistance equal or higher than that of diethylene glycol or triethylene glycol, and has excellent compatibility with the solute, and has the effect of enhancing the electrolytic solution's function of repairing the dielectric layer and reducing the leakage current, and as the result, addition of a certain amount is effective, but is not an essential element for the purpose of the present invention. The diethylene glycol and/or the triethylene glycol which is the main solvent of the present invention is contained preferably in an amount of 30 wt % or more with respect to the whole solvent. When the content thereof is less than that, the expected performance cannot be obtained, the content is more preferably in a range of from 45 wt % to 80 wt %, and the remaining balance is γ-butyrolactone alone or a solvent mixture of γ-butyrolactone and sulfolane.

The present invention makes it possible to obtain a conductive polymer hybrid aluminum electrolytic capacitor, which is a capacitor having a high rated voltage of 63 V or higher and excellent initial characteristics over a wide temperature range spanning from a low temperature to a high temperature, and which withstands 2 or more times of a soldering operation and which can maintain initial characteristics, in particular, low ESR characteristic which is the most important characteristic, even after being subjected to a high temperature reflow soldering process at a temperature higher than 250° C., and which can maintain initial characteristics, in particular, low ESR characteristic which is the most important characteristic, even when used for a long time at a temperature higher than 135° C.

DETAILED DESCRIPTION OF THE INVENTION

Figure 1:
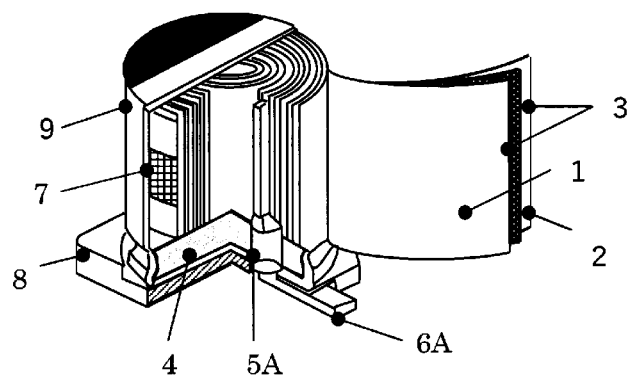
FIG. 1 is a cross-sectional schematic view of the surface mount type electrolytic capacitor, showing the outlook and cross-sectional schematic view of the surface mount type electrolytic capacitor according to an embodiment of the present invention.
Figure 2:
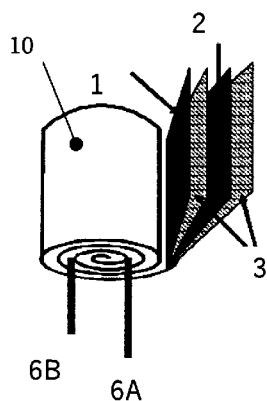
FIG. 2 illustrates internal elements of the electrolytic capacitor, showing an exploded view of the element for illustrating part of the internal elements of the electrolytic capacitor.
Figure 3:
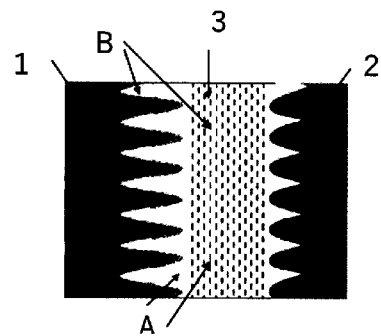
FIG. 3 illustrates the constituent elements within the electrolytic capacitor, schematically showing the anode foil, the cathode foil, and the insulation paper, the electrolytic solution serving as a part of the cathode material, and the conductive polymer all within the electrolytic capacitor element.

The present invention will be described in furthermore detail hereunder by disclosing the typical structure of the conductive polymer hybrid aluminum electrolytic capacitor of the present invention, the representative procedure for producing the capacitor, and the method of evaluating characteristics of the produced capacitor.

(Entire Process of Producing Capacitor)

the typical method of producing the capacitor of the present invention and the representative procedure of manufacturing thereof are as described below. That is, a cylindrical capacitor element 10 (element forming process) is formed by winding an anode foil 1 having thereon a dielectric layer formed by anodizing the surface of a high purity (99.95% or higher) high purity aluminum foil, which is subjected to electrochemical etching or physical deposition to have an expanded surface area available to serve as the electrode, and an electrode slit foil obtained by cutting a cathode foil 2 into slits each having a predetermined width, where the cathode foil 2 is obtained by expanding, in high magnification by the similar method, the surface of an aluminum foil with purity of 99.5% or higher, with a separator paper 3 being interposed therebetween. Subsequently, the end of thus wound element is fixed by a tape for holding element in place. Next, the element is subjected to reforming to repair defects that occurred in the dielectric layer during the cutting and winding process of the foil, and the capacitor element subjected to the foregoing process is immersed in an aqueous solution in which the conductive polymer is dispersed, followed by drying, thereby to form the solid electrolyte layer B of the cathode (solid electrolyte forming process). Thereafter, voids in the capacitor element are impregnated with the electrolytic solution A which contains the solvent and the solute (electrolytic solution impregnation process). The element impregnated with the electrolytic solution is inserted into a cylindrical housing case 9, followed by mounting a sealing rubber 4 at the end of the opening, and thereafter, the opening is mechanically caulked and sealed, followed further by screening during the aging process (sealing and aging process). In the case of a surface mount type hybrid aluminum electrolytic capacitor, a terminal 5A is further inserted into a plastic insulating plate 8, followed by being flattened and bent, and thereafter a tip 6A is cut, thereby to form a finished product (terminal processing process).

The present invention will be described in detail hereunder by describing, as an example, a conductive polymer hybrid aluminum electrolytic capacitor for a surface mount capacitor product.

(Production of Capacitor Element)

One of the factors that determine withstand voltage characteristics of the conductive polymer hybrid aluminum electrolytic capacitor is the forming ratio of the aluminum anode foil 1 (the ratio between the forming voltage for forming a dielectric and the rated voltage of a capacitor), but in the case of the conductive polymer hybrid aluminum electrolytic capacitor, an anode foil having a value larger than that of a generally used electrolyte solution type capacitor, and, although it depends on the rated voltage, in general, an anode foil is used in which a dielectric layer is formed by an anodization reaction by applying the forming voltage of at least twice the rated voltage. A high magnification cathode foil forms a thin film (corresponding to forming at 1 to 10 V), depending on needs. As for the separation paper for separating and insulating between the anode and the cathode, a material or shape which provides excellent capacity of absorbing a liquid, such as a nonwoven fabric made of synthetic fibers, is preferred, but it is not limited thereto in the present invention. As for the thicknesses of the electrode foil, the anode foil has about 100 μm and the cathode foil has about 60 μm in thickness. In the case of a capacitor element in which an anode, a cathode and a separation paper are wound together, defects in the dielectric layer are repaired by an electrochemical forming reaction by the known forming solution, such as an ammonium salt of phosphoric acid, boric acid or adipic acid, and the element is electrically insulated, there will occur no electrical short circuit even when a conductive polymer layer is formed.

(Dispersion of Conductive Polymer)

A capacitor element 10 is obtained after defects in the dielectric are repaired, and the capacitor element is washed with pure water, followed by being dried sufficiently to have moisture removed, and thereafter, particles of the conductive polymer are attached to the capacitor element 10 as the solid electrolyte layer B of the cathode. There is no particular limitation on the type of method for impregnating the capacitor element and attaching the particles of the conductive polymer to the capacitor element, and the capacitor element is immersed in an aqueous solution in which the conductive polymer is dispersed, followed by repetition of depressurization and pressurization, thereby to cause the particles of conductive polymer to penetrate to the inside of the element. As for the conductive polymer, a suspension obtained by dispersing and stabilizing, in water which serves as a solvent, a mixture of fine particles of poly3,4-ethylenedioxythiophene (hereinafter, referred to as PEDOT) and a dopant in a solid form, which is formed of polystyrene sulfonic acid (hereinafter, referred to as "PSS") is most suited. The size of the particles of conductive polymer compound is in submicron or less when the measurement is made in terms of the volume concentration standard average particle diameter (D50) measured by the light scattering method, and preferably in the range of from 0.1 to 0.5 μm and the concentration of the solid conductive polymer is preferably in the range of from 0.5 to 5%.

(Modifier for Improving Penetration and Impregnation of the Element with the Dispersion of the Conductive Polymer)

The most important factor, when forming a solid electrolyte layer, which is the cathode of the capacitor with the particles of the conductive polymer, is to cause the fine particles of the conductive polymer to penetrate into the deep portion in the finely etched pores of an aluminum oxide dielectric, which is formed on the anode surface, so as to increase the effective capacitance (the percentage of coverage over the electrode surface area) as much as possible. To this end, there are various modifiers and methods, but in the present invention, diethylene glycol or triethylene glycol is added in advance to the aqueous dispersion of the conductive polymer at a concentration of 0.3 to 3 wt %, preferably, 0.5 wt %, thereby to reduce the surface tension of the aqueous dispersion and to increase dispersibility of the fine particles of conductive polymer, so that permeability and wettability of the fine particles of the conductive polymer to the finely etched pores of the aluminum oxide dielectric layer can be improved. Furthermore, a two-stage method of forming a cathode is known, where the aqueous solution of the conductive polymer is prepared and the capacitor element is immersed in the aqueous solution to form a pre-coated layer of the conductive polymer in advance, and then the cathode is immersed in the dispersion of the fine particles of conductive polymer. For the foregoing purpose, polyaniline or an aqueous solution of self-doped conductive polymer (trade name: 1% SELFTRON (registered trademark) S aqueous solution, viscosity: about 5 to 10 mPa·s (20° C.)) is recommended for this purpose. In addition, it is useful to use, as a pre-coating layer, a silane coupling agent having a functional group having excellent compatibility with both aluminum oxide of the dielectric and the conductive polymer.

(Impregnation Process Involving Conductive Polymer Dispersion)

The duration time of impregnation, during which the capacitor element is emersed in the solution in which the conductive polymer is dispersed, varies depending on a size of the element, but in the case of an element with 10 ϕ×10.5 L (unit: mm), in general, at least 60 seconds of one single instance of immersion under a reduced pressure (90 Pa) is sufficient, but the same operation is more preferably repeated 2 times to form a conductive polymer layer with an extremely small variation. Excess moisture is removed from the capacitor element pulled up from the aqueous solution of dispersion and the capacitor element is moved to the subsequent drying process.

(Formation of Solid Electrolyte)

In order to remove the excess moisture in the capacitor element which holds the required amount of particles of conductive polymer, the capacitor element is dried to the absolutely dried state in a batch type or continuous type drier set at a predetermined temperature. The preferred drying temperature is 100° C. to a maximum of 150° C., and the drying time is 0.5 to 3 hours, but the drying temperature and the drying time vary depending on drying efficiency of the device. As a result of the drying process, a solid electrolyte layer is formed, which contains the conductive polymer, that reaches the deep portion of the fine pores of the dielectric anode and the modifier.

(Solvent of Electrolytic Solution)

The essential constituent element of the present invention is to use diethylene glycol and/or triethylene glycol as the main solvent of the electrolytic solution, instead of using ethylene glycol which is generally used. Furthermore, γ-butyrolactone alone or a mixture solvent of γ-butyrolactone and sulfolane is contained as the second solvent depending on the purpose. The amount of glycol compound in the entire solvent is at least 30 wt %, and preferably, in the range of 45 wt % to 80 wt %, and the total content of diethylene glycol and/or triethylene glycol and γ-butyrolactone is 80 wt % or more, and preferably, 85 wt % or more. Furthermore, it is known that when polyalkylene glycol, such as polyethylene glycol or a derivative thereof, is added to the electrolytic solution, deterioration by thermal oxidation of the conductive polymer under a severe high-temperature use condition, in which heat generated by a ripple current is superimposed, is prevented and repairability of defects in the dielectric is improved. The average molecular weight of polyalkylene glycol to be added is preferably in the range of relatively low molecular weight of 300 to 1,000 to suppress an increase of the viscosity of the electrolytic solution. When the addition amount thereof is too large, since the viscosity is increased and an impregnation property of the electrolytic solution is deteriorated, the amount of addition is preferably 10 wt % at the max and at least 3 wt %.

(Solute of Electrolytic Solution)

For the solute of the electrolytic solution used in conductive polymer hybrid aluminum electrolytic capacitors in general, ammonia or an amine is used as a base that forms a salt with an alicyclic dicarboxylic acid such as phthalic acid, and an acid such as borodisalicylic acid of a composite compound of an organic acid and an inorganic acid, and among them, alkylamine such as diethylene amine or triethyl amine having high basicity has been recommended rather than ammonia. However, the present inventors confirmed for the first time that it is not possible to obtain a conductive polymer hybrid aluminum electrolytic capacitor having excellent initial characteristics, reflow heat resistance and high-temperature durability, and high temperature rating of 125° C. or higher, or preferably 135° C. or higher, where said capacitor is to be used as a high withstand voltage capacitor having a rated voltage of 63 V or higher, even when the solute containing a salt of aforementioned acid is combined with the solvent of the present invention where diethylene glycol or triethylene glycol is used as the main component. The present inventors confirmed for the first time That, contrary to this, a specifically remarkable effect on the characteristics are exhibited only by the combination of the solvent used in the present invention and the solute comprising a salt of a specific acid and a specific amine produces the specifically remarkable effect on the aforesaid characteristics, and the present invention was made based on these findings. That is, in the case of a conductive polymer hybrid aluminum electrolytic capacitor filled with an electrolytic solution obtained by combining the solvent containing ethylene glycol and γ-butyrolactone or sulfolane disclosed in the prior patent document and the specific solute used in the present invention, the results aimed by the present invention such as withstand voltage characteristics and heat resistance could not be obtained. The specific acid and the specific amine used in the present invention are as follows. The specific acid has to have 12 or more carbon atoms and, further, to be a long-chain dibasic carboxylic acid. The specific amine has to be an amine having a high boiling point of 150° C. or higher. As for such a long-chain dibasic carboxylic acid, dicarboxylic acid such as dodecanedioic acid, 2-butyloctanedioic acid, tetradecanedioic acid, isoeicosadienoic acid, and dimer acid, is preferred. In the present invention, several types of carboxylic acids constituting one component of the specific solute described above may be combined, and a carboxylic acid which is generally used and has fewer than 12 carbons can also be used as long as it is a highly heat-resistant aromatic carboxylic acid (for example, phthalic acid or trimellitic acid) to the extent that the withstand voltage characteristics are not impaired. In addition, as for the specific amine referred to here, alkylamine such as dibutylamine (boiling point: 159° C.), tripropylamine (boiling point: 156° C.), or tributylamine (boiling point: 217° C.), aromatic amine such as aniline (boiling point: 184° C.), toluidine (boiling point: 200° C.), N-methylaniline (boiling point: 196° C.), imidazole (boiling point: 256° C.), and derivatives thereof (including a quaternary imidazolium salt), diazabicyclononene (boiling point: 240° C.) and diazabicycloundecene (boiling point: 261° C.) which have a cyclic amidine skeleton, or amine having another amidine skeleton and amine derivative thereof, and derivatives thereof (including a quaternary amidinium salt), and a heterocyclic amine compound, is preferred. In particular, it is confirmed that diazabicycloundecene (boiling point: 261° C.) has the effect of increasing thermal stability and an effect of increasing withstand voltage characteristics (spark voltage) of the electrolytic solution. It is preferable that the amount of amine to be mixed is less than that of the carboxylic acid so that a pH of the electrolytic solution is adjusted to be in a range of 4 to 8, and preferably, 4 to 6. When a large amount of the amine is mixed, since the amine reacts with the dopant used in a conductive molecule, which may cause dedoping, the amount of amine is required to be as small as possible. It is possible to use only a carboxylic acid for the solute without mixing with the amine, but since when the pH of the electrolytic solution is 4, problems such as deterioration of the carboxylic acid (esterification with the solvent or the like) and corrosion of an electrode or a formed film occur, it is required for the carboxylic acid to be neutralized with amines to some extent. Since the solute containing the salt formed of the specific acid and the base is easily dissolved in a solvent containing diethylene glycol and/or triethylene glycol as a main component, the solute is used after being dissolved in the solvent constituting the electrolytic solution of the present invention. The solution obtained by combining the carboxylic acid and the amine is formulated so that the concentration thereof is in a range of 5 to 40%, and preferably, 10 to 25%. The electrolyte is mixed in an appropriate amount without excess or deficiency in the concentration. When the concentration is too low, electric conductivity of the electrolytic solution is insufficient, and thus, the characteristics of the electrolytic solution suitable for the capacitor having a low ESR cannot be obtained. In addition, when an excessive amount of material which is relatively expensive than the solvent is added to the electrolyte, the cost of the electrolytic solution is increased. Further, the electrolyte having a high concentration precipitates from the electrolytic solution due to low solubility in a low temperature environment, which causes a problem in the capacitor. Therefore, the amount of the electrolyte added to the solvent is required to be adjusted to fall within an appropriate range depending on the electrolyte. In the case of isoeicosadienoic acid which is a long-chain dibasic carboxylic acid and diazabicycloundecene which is an amine that are preferably included in the solute of the present invention, the addition amount of isoeicosadienoic acid (referred to as iEDA) is 10 to 25 wt %, and preferably, 10 to 20 wt %, and the addition amount of diazabicycloundecene (referred to as DBU) is 0.5 to 4.0 wt %, and preferably 1.0 to 2.0 wt %, with respect to 100 parts by weight of the solvent. It is not clear as to why the electrolytic solution composed of the combination of the solute containing a salt of a specific long-chain dibasic carboxylic acid and a specific amine having a high boiling point and the main solvent, such as diethylene glycol, provides such a remarkable effect in the capacitor having a high withstand voltage and high heat resistance, but it is presumed that, under the condition that the scope of present invention is not restricted, the electrolytic solution, having a high compatibility between the solvent and the solute, maintains high withstand voltage characteristics and high thermal stability, and is present at the interface between the conductive polymer and the dielectric oxide aluminum, which greatly enhance the blending of these elements.

(Electrolytic Solution Impregnation Process)

When moisture is included in the capacitor element in which the solid electrolyte is formed containing the conductive polymer, a large deterioration in characteristics occurs. Therefore, the capacitor element is transferred, while being maintained in the absolutely dried condition, to the process of filling the electrolytic solution, which is the next process. In the environment surrounding the transfer process and the filling process, the humidity and the temperature are strictly controlled, and in particular, the humidity is maintained as low as possible to prevent absorption of moisture by the capacitor element. In the filling process of the electrolytic solution, the desirable control level of absolute humidity is 6.0 g/m³ or less. It is the process where the capacitor element, in which the solid electrolyte layer containing the conductive polymer of the first cathode is formed, is immersed in the electrolytic solution containing the above-described solute, which has ionic conductivity and is used in the present invention, and the above-described solvent, which dissolves the solute and is used in the present invention, to fill (impregnate) the void portion in the capacitor element with the electrolytic solution. The condition of impregnating the electrolytic solution is not particularly limited, but the impregnation operation is preferably performed by repeating normal depressurization and pressurization, and in general, the temperature of the electrolytic solution is set at the room temperature, but the electrolytic solution may be heated up to a maximum of 100° C. for the impregnation. The impregnation at high temperature accelerates the rate of penetration of the electrolytic solution into the central portion of the element and also enhances an affinity between the electrolytic solution and the conductive polymer. A preferred heating temperature of the electrolytic solution is 60° C. to 80° C.

(Sealing and Reformation Inspection Process)

The capacitor element filled with the electrolytic solution is inserted into a housing case 9, a sealing rubber 4 is mounted at the end of the opening, the end of the opening is sealed by mechanical curl processing, a high voltage is applied by a rated voltage, aging is performed in a high temperature state, defective parts of the aluminum anode dielectric is repaired through a reformation reaction by the electrolytic solution, electrical characteristics are measured, and products within a standard are screened to transfer an acceptable capacitor to a next process.

(Processing to Surface-Mounting Component)

In the case of a surface mount type hybrid aluminum electrolytic capacitor, the terminal 5A is further inserted into the plastic insulating plate 8, the terminal is flattened and bent, and the tip 6A is cut to form a finished product. The present invention relates to a surface mount type conductive polymer hybrid aluminum electrolytic capacitor having excellent lead-free high temperature reflow heat resistance, but is not limited to a structure thereof. The present invention is a technique applied to improve durability and reliability of a hybrid capacitor having a radial-lead structure which does not require a reflow process and having a rated voltage of 63 V or higher at a high temperature.

(Acceptance Determination of Capacitor)

Withstand voltage characteristics of a capacitor having a changed composition of the electrolytic solution of the conductive polymer hybrid aluminum electrolytic capacitor can be determined by the spark voltage of the electrolytic solution, but the rated voltage of the capacitor is finally determined by a result of a withstand voltage design of the capacitor obtained by combining the magnitude of the spark voltage and the margin rate of forming voltage of the anode foil, and the quality of the capacitor is determined by the yield during the inspection process after the required aging voltage is applied to the rated voltage during the aging inspection (reformation inspection) process of a capacitor producing process. The aging acceptance rate of a general conductive polymer hybrid aluminum electrolytic capacitor is 99.9% or higher. The reflow heat resistance and the high-temperature reliability test is applied to the capacitor, which were subjected to these processes, as part of the evaluation for the conductive polymer hybrid aluminum electrolytic capacitor according to the present invention.

(Lead-Free Reflow Heat Resistance)

Under the condition that the temperature profile (capacitor diameter: 10 (I)) for the soldering heat resistance evaluation is +230° C. for 80 seconds with a peak temperature of 250° C., which is more severe than the lead-free reflow condition of IPC/JEDEC J-STD-020D, heating was performed up to 3 times to measure changes in the height dimension (swelling) and electrical characteristics. The generally accepted condition for reflow of the conductive polymer hybrid aluminum electrolytic capacitor having the rated voltage of 63 V or higher and a case size of φ 8 to 10 mm is such that the temperature profile is within +230° C. for 40 seconds with a peak temperature of 245° C. and the number of times of reflow is 2. The determination of acceptance or rejection of the reflow heat resistance was made as follows:

Swelling amount of capacitor in height direction: <0.2 mm: Good (○), 0.2 to 0.3 mm: Normal (Δ), 0.3 mm<: Poor (X)

Change in capacitance: ΔC<5%: Acceptable, 5%<: Not acceptable

Change in ESR: ΔESR<300% (3 times): Acceptable, 300% (3 times)<: Not acceptable (High-Temperature Reliability Test)

The capacitor subjected to the evaluation of the reflow heat resistance was set in a high temperature bath set at 125° C. or 135° C. and held under the rated voltage, the capacitor was removed from the high temperature bath at intervals of 500 hours and cooled to room temperature, and the capacitance, dielectric dispersion DF, leakage current, and ESR were measured to calculate the rate of change from initial values (before the reflow heat resistance test). The determination of acceptance or rejection of the high-temperature reliability test was made as follows: ΔC (capacitance)≤30%, ΔDF≤200%, ΔESR≤200%, and LC<0.01 CV.

(Evaluation of Electrolytic Solution)

For evaluation of the electrolytic solution, in the cases in which many types of the electrolytic solutions described in examples and comparative examples were used, such as:

1) a combination of the solvent and the solute used in each of the examples and the comparative examples,
2) a composition of the electrolytic solution described in each of the prior patent documents,
3) a combination of a solvent other than the solvent used in the present invention and the solute used in the present invention,
4) a combination of the solvent used in the present invention and a solute other than the solute used in the present invention, and
5) a combination of a solvent other than the solvent used in the present invention and a solute other than the solute used in the present invention, a spark voltage at which a scintillation phenomenon occurs, and a viscosity of the solution related to a permeation rate of the electrolytic solution into the capacitor element were measured.

In the case where the electrolytic solution according to the present invention is used, it is possible to prevent deterioration of the withstand voltage characteristics due to the lead-free reflow of the conductive polymer hybrid aluminum electrolytic capacitor having a surface-mounting structure or to prevent swelling of the capacitor which may lead to a reduction of the reliability. In the most preferred embodiment of the present invention, it is possible to provide a conductive polymer hybrid solid electrolytic capacitor capable of implementing a wide range of rated voltage spanning from a low voltage to a medium and high voltage of 63 V to 200 V or higher through a single electrolytic solution mixing formulation and having high reliability even at a high temperature higher than 125° C. at a low ESR while having high withstand voltage characteristics and maintaining a charge and discharge performance at a low temperature. In the prior art, various withstand voltage improvement agents are generally added to obtain a conductive polymer hybrid aluminum electrolytic capacitor having a high withstand voltage rating, and on the other hand, in the present invention, it is possible to obtain a 200 V rating capacitor with only one single electrolytic solution obtained by combining the specific glycol compound and the specific solute having high withstand voltage characteristics. In addition, the conductive polymer hybrid aluminum electrolytic capacitor using the electrolytic solution according to the present invention has particularly excellent high temperature reflow heat resistance, and the electrolytic solution according to the present invention has great effect of improving reflow heat resistance of a medium-sized surface mount type conductive polymer hybrid aluminum electrolytic capacitor which has been under a large restriction hitherto due to the reflow heat resistant temperature.

EXAMPLES

Hereinafter, the present invention will be described in more detail based on examples, but the scope of the present invention is not limited to the examples.

In each of the examples, a surface-mounting capacitor having a rated voltage of 80 WV, a capacitance of 39 uF, a diameter of $\phi$ 10.0 mm, and a height of 10.0 mm was produced and evaluated.

In the element forming process by the method of producing the capacitor as described above, a high purity anode foil obtained by performing a high magnification etching treatment on a high purity aluminum foil having a thickness of 105 μm and a purity of 99.95% and then anodizing the purity aluminum foil at a formation voltage of 150 V, and a cathode foil obtained by subjecting the etched foil having a thickness of 60 μm and a purity of 99.5% to low-voltage forming (2 V) were prepared as the material required for producing a conductive polymer hybrid aluminum electrolytic capacitor having a rated voltage 80 V and a nominal capacitance of 39 μF. Next, tab terminals for an anode and a cathode were connected to each other by punch caulking processing and a separator paper mainly formed of a cellulose fiber insulating the tab terminals is interposed between the tab terminals to prepare a capacitor element (size: 9 $\phi$×6.5 L, unit: mm) corresponding to a capacitor having a size of 10 $\phi$ (diameter: mm)×10.5 L (maximum height: mm). In order to insulate the metal surface of the cross section of the electrode foil, which was formed by the winding operation and by cutting of the electrode foil, the Protrusions, the defective part of the aluminum oxide dielectric in the element, reformation was performed by immersing the welded capacitor element in an ammonium citrate aqueous solution while applying a direct voltage for 40 minutes, after welding the capacitor element in a plurality of units to a metal bar. Next, 100 elements, obtained after repeated washing, with pure water, of the attached chemicals and drying at a high temperature of 120° C., were prepared in each in the examples and the comparative examples.

Next, the commercially available PEDOT/PSS conductive polymer dispersion aqueous solution at a concentration of 2% was placed in a 1-liter container and diethylene glycol was added thereto, so that the concentration thereof becomes 0.5 wt % to obtain the aqueous solution containing dispersed conductive polymer used in the present invention, the inside of the capacitor element was impregnated with the aqueous solution containing the dispersed conductive polymer by immersing the 50 dried capacitor elements in the conductive polymer dispersion aqueous solution per batch, putting the entire container in a chamber under a reduced pressure, and repeating twice the process of decomposition and return to normal pressure, and the capacitor element was pulled up and dried in a vacuum dryer set at 80° C., thereby preparing a capacitor element in which a solid electrolyte layer formed of a conductive polymer was formed as a first cathode. In order to compensate for the difference in the conditions among batches, all of the capacitor elements used in the following experiments were randomly sampled.

Next, a capacitor element in which a required number of the solid electrolyte layers were formed was prepared and filled with the electrolytic solution shown in Tables 1 and 2. Each of the capacitors of the comparative examples or the examples shown in Tables 1 and 2 is a conductive polymer hybrid aluminum electrolytic capacitor having the rated voltage of 80 V and the nominal capacitance of 39 μF, and is a capacitor which is produced so that the difference is found only in the composition of the electrolytic solution used for the impregnation after the solid electrolyte layer is formed. The electrolytic solution with which the capacitor element was impregnated was quickly and mechanically sealed with a sealing rubber and transferred to the next process of aging reformation inspection. In the aging process, a voltage of 80 V equal to the rated voltage was applied, the capacitor elements were aged in a thermostatic bath at 85° C. for about 50 minutes, and the non-defective sample, excluding those products defective in terms of capacitance, ESR, and leakage current, was produced. In the process of producing the capacitor, when constituent materials other than the electrolytic solution were mixed and the amount of moisture to be contained in the capacitor element was thus increased, since the reflow heat resistance was remarkably reduced, air conditioning in the room was performed so that a temperature and an absolute humidity was 6.0 g/m$^3$ or less until the capacitor element was dried and filled with the electrolytic solution and then was subjected to the sealing process with the sealing rubber, thereby controlling a content of moisture in the capacitor element to 1 wt % or less. Finally, an electrode terminal was inserted into an insulating plate formed of a PPS resin, the terminal was flattened and bent, the tip was cut off, and then the electrical characteristics were inspected, thereby completing a surface-mounting shaped capacitor.

Table 1 shows the electrolytic solution containing diethylene glycol, ethylene glycol alone, which is a representative solvent in the related art, or a solvent obtained by combining ethylene glycol and γ-butyrolactone (GBL) or sulfolane, and a solute used in each of the examples in WO 2014/021333 A, WO 2017/056447 A, and JP 2018-74046 A, that is, a solute (a pH is adjusted to 4 to 5 and added in a 75 wt % GBL solution) formed of a salt of a borodisalicylic acid which is an alicyclic monobasic carboxylic acid and does not belong to the scope of the present invention, and triethylamine which is an amine having a low boiling point and does not belong to the scope of the present invention, and initial values of a spark voltage and a solution viscosity of the electrolytic solution, and a capacitance and an equivalent series resistance (ESR) of each of the samples in a conductive polymer hybrid aluminum electrolytic capacitor filled with the electrolytic solution in each of the comparative examples. The number of produced capacitors was 50 at each level, and among them, 5 capacitors were randomly selected and evaluated.

TABLE 1

Characteristics of electrolytic solution formed of solute which does not belong to scope of the present invention and initial characteristics of capacitor (80 V and 39 μF) filled with electrolytic solution

| Comparative Example | Solvent of electrolytic solution | | | | Solute | Characteristics of electrolytic solution | | Initial characteristics (before reflow) | |
|---|---|---|---|---|---|---|---|---|---|
| | EG | DEG | GBL | TMS | BSalA + TEA | Spark voltage (V) | Solution viscosity (CP) | Capacitance (uF) 20° C. | ESR 100 kHz 20° C. (mΩ) |
| Comparative Example 1 | 60% | | 40% | | 10% | 202 | 1.9 | 40.9 | 13.2 |
| Comparative Example 2 | 40% | | 40% | 20% | 10% | 210 | 3.5 | 41 | 13 |
| Comparative Example 3 | 35% | | 10% | 55% | 10% | 226 | 6.5 | 40.9 | 12.9 |
| Comparative Example 4 | 60% | | | 40% | 10% | 223 | 5.3 | 40.9 | 12.5 |
| Comparative Example 5 | | 60% | 40% | | 10% | 218 | 7.6 | 40.8 | 13.4 |
| Comparative Example 6 | | 40% | 60% | | 10% | 225 | 6.8 | 40.9 | 13 |
| Comparative Example 7 | | 55% | 30% | 15% | 10% | 229 | 5.8 | 40.8 | 13.4 |
| Comparative Example 8 | | 30% | 60% | 10% | 10% | 232 | 5 | 40.9 | 13.2 |

EG: Ethylene glycol,
DEG: Diethylene glycol,
GBL: γ-Butyrolactone
TMS: Sulfolane,
BSalA + TEA: Borodisalicylic acid and triethylamine In the solvent compositions of Comparative Examples 5 to 8 containing the solvents used in the present invention, in the electrolytic solution containing the salt of borodisalicylic acid and triethylamine as a solute which does not belong to the scope of the present invention, not only the characteristics such as a spark voltage and a solution viscosity but also the initial characteristics (capacitance and ESR) of the conductive polymer hybrid capacitor filled with the electrolytic solution are the same as those of an electrolytic solution formed of ethylene glycol which is a representative solvent in the related art or a solvent obtained by combining γ-butyrolactone (GBL) or sulfolane. Next, Table 1-1 shows the results of conducting a soldering heat resistance test (3 times) and a high-temperature reliability test at 125° C. and 135° C. on each of the capacitors of Comparative Examples 1 to 8 shown in Table 1.

layer is peeled off or oxidative deterioration of the conductive polymer at a high temperature occurs, which causes insulation deterioration.

Therefore, as a result of extensive search by the inventors for a solute which has excellent compatibility with diethylene glycol and contributes to the stability of the conductive polymer even under a high-temperature and high-voltage condition, the present inventors found a solute having an excellent stabilizing action.

In Tables 2 and 2-1, each of the examples is a case using a capacitor impregnated with an electrolytic solution of a composition formed of a premix solution (a pH is adjusted to 6, added in a state of a premix solution obtained by dissolving the salt in a solvent formed of 40 wt % of GBL

TABLE 1-1

| Comparative Example | Soldering heat resistance test Swelling (mm) Average/maximum | Change in capacitance ΔC/Co (%) | ESR (mΩ) | 80 V at 125° C. 1,000 hours Change in capacitance ΔC/Co (%) | ΔESR | 80 V at 135° C. 1,000 hours Change in capacitance ΔC/Co (%) | ΔESR |
|---|---|---|---|---|---|---|---|
| Comparative Example 1 | ○/△ | −1.22% | 16.9 | −5.80% | 2192% | −6.61% | 2061% |
| Comparative Example 2 | △/X | −1.24% | 20.9 | −5.67% | 2296% | −10.27%*[1] | 2932%*[1] |
| Comparative Example 3 | ○/△ | −1.27% | 19.3 | −4.56% | 1744% | −7.84%*[2] | 2974%*[2] |
| Comparative Example 4 | ○/△ | −1.25% | 20.4 | −3.67% | 1528% | −3.75% | 1395% |
| Comparative Example 5 | ○/○ | −1.20% | 19.2 | −7.01% | 3076% | −11.66% | 7900% |
| Comparative Example 6 | ○/○ | −1.05% | 19.8 | −5.58% | 1207% | −15.67% | 4120% |
| Comparative Example 7 | ○/△ | −1.03% | 18.8 | −4.88% | 2726% | −10.17% | 4251% |
| Comparative Example 8 | ○/○ | −1.03% | 19.8 | −4.19% | 2538% | −6.54%*[3] | 1439%*[3] |

*[1]Defect in one valve after 500 H, defect in one DF (dielectric loss) after 1,000 H
*[2]Defect in one DF (dielectric loss) after 500 H
*[3]Defect in one DF (dielectric loss) after 1,000 H In the soldering heat resistance test of the conductive polymer hybrid electrolytic capacitor filled with each of the electrolytic solutions containing diethylene glycol in Comparative Examples 5 to 8, the swelling of the capacitor is relatively small and the change in capacitance of the capacitor tends to be small as compared with Comparative Examples 1 to 4, in which the electrolytic solution containing ethylene glycol known in the related art, is used. However, as a result of conducting the reliability test in which the rated voltage (80 V) was continuously applied under the temperature conditions of 125° C. and 135° C., the equivalent series resistance (ESR), which was the most important characteristic of the conductive polymer hybrid aluminum electrolytic capacitor, was abnormally increased, there was no effect due to a difference in solvent, all of the results were not acceptable based on the above determination criteria, and only a capacitor having poor reliability was obtained. It is presumed that this is because, when the electrolytic solution composition formed of borodisalicylic acid and triethylamine which are used for the solute, the solvent used in the present invention, and the known solvent is under a high temperature and high voltage application condition at a high rated voltage of 80 V, the stability of the conductive polymer is impaired, such that the dielectric and 40 wt % of DEG) obtained by dissolving diethylene glycol and a solute formed of a salt of isoeicosadienoic acid (UB-20, produced by OKAMURA OIL MILL, LTD) which is the solute used in the present invention and diazabicycloundecene in a solvent, and each of the comparative examples is a case using a capacitor impregnated with an electrolytic solution obtained by replacing DEG used in the present invention with EG in the related art among the solvents in the premix solution used in the example. The spark voltage of the electrolytic solution in each case and the initial values of capacitance and the equivalent series resistance (ESR) of each of samples (n=5) of the conductive polymer hybrid aluminum electrolytic capacitor filled with each electrolytic solution are shown in Tables 2 and 2-1.

As shown in Table 2, it is observed that in the case in which the electrolytic solution containing diazabicycloundecene salt of long-chain dibasic carboxylic acid where the salt is known as a solute having excellent high withstand voltage characteristics is used, the present invention where diethylene glycol is used as the solvent shows that the spark voltage is particularly improved as compared to the case in which ethylene glycol which is the known solvent is used.

TABLE 2

Spark voltages in examples in which electrolytic solution obtained by combining solvent and solute of the present invention is used and comparative examples

| Comparative Example/Example | Solvent of electrolytic solution | | | | Solute Isoeicosadienoic acid + DBU | Spark voltage of electrolytic solution |
|---|---|---|---|---|---|---|
| | EG | DEG | GBL | TMS | | |
| Comparative Example 9 | 35% | | 10% | 55% | 15% | 386 |
| Comparative Example 10 | 40% | | 40% | 20% | 15% | 368 |
| Comparative Example 11 | 55% | | 30% | 15% | 15% | 357 |
| Example 1 | | 30% | 60% | 10% | 15% | 498 |
| Example 2 | | 55% | 30% | 15% | 15% | 467 |

The salt of isoeicosadienoic acid and diazabicycloundecene used in the present invention was added as a premixed solvent which comprises 20 wt % salt of the foregoing, 40% GBL and 40% EG in the case of Comparative Examples, and it was added as a premixed solvent which comprises 20 wt % of the foregoing, 40% GBL and 40% DEG in the case of Examples. In addition, sulfolane was used after dissolving (90 wt %) in γ-butyrolactone.

Each of the capacitor elements, which were manufactured using the same material and the same process and conditions with respect to up to the step of forming the solid electrolyte by the conductive polymer, was filled with each of the electrolytic solutions of Comparative Examples 9, 10 and 11 and Examples 1 and 2 shown in Table 2, and thereafter, 500 conductive polymer hybrid aluminum electrolytic capacitors, which were inspected and assembled in the subsequent processes, were prepared, and 10 capacitors among them were evaluated with respect to the initial values of electrical characteristics and the soldering heat resistance under the above conditions. The results are shown in Table 2-1.

the same as those when ethylene glycol was used. As for the result of the soldering heat resistance test, in Examples 1 and 2, excellent results in all aspects of swelling, change in capacitance and increase in the rate of ESR were obtained as compared to the case in which ethylene glycol was used.

In addition, the high-temperature reliability test was performed on the samples (10 samples were divided into two groups) subjected to the soldering heat resistance test shown in Table 2-1 in the condition where a rated voltage (80 V) at 125° C. and 135° C. was applied. According to the results of the reliability test at 125° C. as shown in Table 2-2, in each of the capacitors filled with the corresponding electrolytic solution of Comparative Examples 9, 10, and 11, ESR increased by from 17 times to 190 times of the initial value (after the soldering heat resistance test) 1,000 hours after the start of the test, and thus, the capacitor was determined as not acceptable. After 3,000 hours, the capacitance also decreased by more than 20%. In the case of the same mix composition using the solvent, the result showed the same low reliability as that of the case of capacitors of Examples

TABLE 2-1

Initial characteristics of capacitor containing electrolytic solution obtained by combining solvent and solute of the present invention and results of soldering heat resistance test (80 V, 39 μF, 10 φ × 10.5 L)

| Comparative Example/ Example | Solvent of electrolytic solution | | | | Solute of the present invention | Initial characteristics | | | Results of soldering heat resistance test (3 times) | | | |
|---|---|---|---|---|---|---|---|---|---|---|---|---|
| | EG | DEG | GBL | TMS | | Capacitance (μF) | ESR (mΩ) +20° C. *1 | ESR (mΩ) −40° C. *2 | Swelling Average/maximum | Capacitance ΔC | ESR (mΩ) +20° C. *1 | ESR (mΩ) 40° C. *2 |
| Comparative Example 9 | 35% | | 10% | 55% | 15% | 40.9 | 13.8 | 15.2 | ○/X | −0.83% | 27.9 | 32.2 |
| Comparative Example 10 | 40% | | 40% | 20% | 15% | 40.9 | 14.2 | 15.7 | ○/Δ | −0.83% | 26.1 | 39.9 |
| Comparative Example 11 | 55% | | 30% | 15% | 15% | 41.8 | 13.9 | 14.7 | Δ/X | −0.71% | 26.1 | 37.3 |
| Example 1 | | 30% | 60% | 10% | 15% | 41.9 | 14.4 | 15.7 | ○/○ | −0.80% | 21.3 | 25.6 |
| Example 2 | | 55% | 30% | 15% | 15% | 40.9 | 14.2 | 14.8 | ○/○ | −0.78% | 14 | 14.3 |

*1 Measurement frequency 100 kHz (the same below),
*2 Measurement frequency 10 kHz (the same below)

According to the results shown in Table 2-1, it can be appreciated that the initial characteristics, such as ESR at room temperature and at the low temperature of −40° C., do not show significantly difference between the Comparative Examples and the Examples, and in the case where diethylene glycol is used, the low temperature characteristics are 1 through 4, where they were filled with the electrolytic solution which used, as the solute, triethylamine salt of borodisalicylic acid, which falls outside the scope of the present invention. On the other hand, in the case of Examples 1 and 2, the decrease rate of capacitance after 3,000 hours was 10% or less, and the change rate of ESR increased by only about 5 times of the initial value even after the test time of 3,000 hours, and high reliability was observed.

place of ethylene glycol which is a known solvent, but the advantage thereof was not obtained. However, in the case when the electrolytic solution obtained by using diazabicy-

TABLE 2-2

Results of reliability test at 125° C.

| Comparative Example/ Example | After soldering heat resistance test | | 80 V at 125° C. after 1,000 hours | | | 80 V at 125° C. after 3,000 hours | | |
|---|---|---|---|---|---|---|---|---|
| | Capacitance (μF) | ESR (mΩ) 20° C. | Change in capacitance ΔC (%) | ΔESR (%) 20° C. | Acceptance determination | Change in capacitance ΔC (%) | ΔESR (%) 20° C. | Acceptance determination |
| Comparative Example 9 | 40.5 | 27.9 | −3.60% | 1700% | X | −20.30% | 10012% | X |
| Comparative Example 10 | 40.5 | 26.1 | −3.40% | 1775% | X | −19.50% | 6653% | X |
| Comparative Example 11 | 41.1 | 26.1 | −7.20% | 18900% | X | −28.50% | 25000% | X |
| Example 1 | 41.3 | 21.3 | −2.60% | 272% | ○ | −8.20% | 500% | X |
| Example 2 | 40.6 | 14 | −1.40% | 114% | ○ | −3.69% | 140% | ○ |

Table 2-3 shows the results of the reliability test in which the rated voltage was applied at a higher temperature of 135° C. In the case of Comparative Examples 9, 10, and 11, the rate of increase in ESR after 500 hours was 6 times or more of the initial value, and all of the capacitors were determined as not acceptable. In addition, after 1,000 hours, the decrease rate of capacitance was more than 20%, and ESR also increased by 80 times or more, and thus, the test was terminated. On the other hand, it was observed that in Examples 1 and 2, both the capacitance and ESR were only slightly changed up to 500 hours. In addition, after 1,000 hours, in Example 1 in which the content of diethylene glycol (DEG) was small (30 wt % based on the entire solvent), ESR increased up to about 8 times and it was thus determined as not acceptable, but ESR was maintained at lower values than any of the cases of the comparative examples. In addition, in Example 2 (55% of DEG), even in the case where measurement was performed after 1,000 hours, the change in capacitance was extremely small, and the rate of ESR increase was about 40%, which showed extremely high stability in heat resistance.

cloundecene salt of isoeicosadienoic acid was used as the solute, an apparent advantage was observed as compared with the case where the electrolytic solution containing ethylene glycol solvent was used.

In addition, Table 3 shows the result of tests on the initial characteristic, soldering heat resistance and high-temperature reliability, which were conducted on the samples of conductive polymer hybrid aluminum electrolytic capacitor, where each sample contains corresponding electrolytic solution which was prepared by dissolving the solute used in the present invention in a solvent, other than diethylene glycol, having a high boiling point. The mixing ratio of the solvents was fixed at 55 wt % for glycol, 30 wt % for γ-butyrolactone, and 15 wt % for sulfolane. In addition, the materials and production conditions of the capacitor were the same as those in the case of Comparative examples and Examples, and thus obtained capacitors each was characterized by such that the rated voltage was 80 V, the nominal capacitance was 39 μF, the diameter was 10 mm, and the height was 10.5 mm. In the case of the electrolytic solution shown in Table 3, the solute is diazabicycloundecene salt of isoeicosadienoic acid,

TABLE 2-3

Results of reliability test at 135° C.

| Comparative Example/ Example | After soldering heat resistance test | | After 500 hours | | | After 1,000 hours | | |
|---|---|---|---|---|---|---|---|---|
| | Capacitance (μF) | ESR (mΩ) 20° C. | Change in capacitance ΔC (%) | Δ ESR 20° C. | Acceptance determination | Change in capacitance ΔC (%) | Δ ESR 20° C. | Acceptance determination |
| Comparative Example 9 | 40.5 | 27.9 | −7.80% | 984% | X | −21.30% | 11000% | X |
| Comparative Example 10 | 40.5 | 26.1 | −5.60% | 664% | X | −19.10% | 7984% | X |
| Comparative Example 11 | 41.1 | 26.1 | −9.80% | 1455% | X | −35.30% | 20030% | X |
| Example 1 | 41.3 | 21.3 | −3.80% | 145% | ○ | −13.80% | 790% | X |
| Example 2 | 40.6 | 14 | −0.44% | 0% | ○ | −0.20% | 139% | ○ |

The electrolytic solution, which was used in the foregoing Comparative Examples 1 through 8 and which used triethylamine salt of borodisalicylic acid as the solute, was the electrolytic solution where diethylene glycol used in the present invention was used as a component of solvent, in and the content thereof is 15 wt % with respect to the solvent in terms of outer percentage, but the solute is dissolved in a glycol solvent having 40 wt % of GBL and 40 wt % of DEG, and as for the glycol in these cases, the glycol used in each of the Comparative Examples and Examples is used.

TABLE 3

Selected range of glycol having high boiling point and effect of improving heat resistance thereof (rating of 80 V, 39 μF, 10 φ × 10.5 L)

| Comparative Example/ Example | Solvent Glycol 55% GBL30% TMS15% | | Initial value of ES | Soldering heat resistance test | | High-temperature reliability test 135° C. 1,000 hours | |
|---|---|---|---|---|---|---|---|
| | Glycol | Boiling point | (mΩ) 20° C. | Swelling (Average/maximum) | ESR (mΩ) 20° C. | Change in capacitance ΔC (%) | Δ ESR (%) 20° C. |
| Comparative Example 11 | EG | 198° C. | 9.9 | Δ/X | 55.7 | −22.3 | +2003 |
| Comparative Example 12 | PG | 188° C. | 10.8 | Δ/X | 38.8 | −18.3 | +1300 |
| Comparative Example 13 | DPG | 232° C. | 15.5 | Δ/Δ | 21.5 | −16.3 | +988 |
| Comparative Example 14 | TRAG | 329° C. | 16.8 | Δ/Δ | 23.8 | −12.3 | +1255 |
| Comparative Example 15 | TPG | 273° C. | 14.8 | Δ/Δ | 33.6 | −19.3 | +1866 |
| Example 2 | DEG | 245° C. | 14.2 | ○/○ | 14 | −0.2 | +139 |
| Example 3 | TEG | 285° C. | 15 | ○/Δ | 23.1 | −1.5 | +265 |
| Example 4 | DEG 50% + TEG 50% | 245° C.< | 15.9 | ○/Δ | 20.1 | −5.5 | +255 |

(Solute) Isoeicosadienoic acid and diazabicycloundecene 15% (outer percentage with respect to 100 parts by weight of solvent)
EG: Ethylene glycol (HOCH$_2$CH$_2$OH)
PG: Propylene glycol (CH$_3$CH(OH)CH$_2$OH)
DEG: Diethylene glycol (HO(CH$_2$CH$_2$O)$_2$H)
TEG: Triethylene glycol (HO(CH$_2$CH$_2$O)$_3$H)
DPG: Dipropylene glycol (CH$_3$CHOHCH$_2$OCH$_2$CHOHCH$_3$)
TRAG: Tetraethylene glycol (HO(CH$_2$CH$_2$O)$_4$H)
TPG: Tripropylene glycol (HO[CH(CH$_3$)CH$_2$O]$_3$H)

The comparison between the Comparative Examples and the Examples shows that there is no remarkable difference in initial characteristics with respect to the used glycol solvents, and the results are the same as those of the case where the electrolytic solution using diethylene glycol of the Examples was used as the solvent. On the other hand, as the result of soldering heat resistance test showed that, in the case of diethylene glycol, triethylene glycol, or a solvent mixture of diethylene glycol and triethylene glycol in each of the Examples, the swelling of the capacitor was relatively small and the change in the initial value of ESR was relatively small. It was observed that among the Comparative Examples and the Examples, in the case where ethylene glycol and propylene glycol having a low boiling point of 200° C. or lower were used, the swelling of the capacitor due to heating was large and the change rates of ESR showed the same tendency, but no clear correlation was observed between the boiling point of other glycols having a high boiling point of 230° C. or higher, and the soldering heat resistance was not necessarily high as observed in the case where the glycol of each of the Comparative Examples 13, 14, and 15 was used.

Remarkably large difference among various types of glycols is found in high thermal stability and reliability. From the results shown in Table 3 where the rated voltage of 80 V was applied and the durability was evaluated in terms of the decrease rate of capacitance in the capacitor and the rate of ESR increase of those capacitors after being subjected to heat aging in a high temperature bath at 135° C. for 1,000 hours, it was found that in the case of triethylene glycol, the durability and stability were almost same as those in the case of diethylene glycol. However, in the case of dipropylene glycol, tripropylene glycol, or tetraethylene glycol, the durability was inferior, and the same tendency was shown as in the capacitor filled with the electrolytic solution of Comparative Example 11 or 12 in which ethylene glycol or propylene glycol having a low boiling point was used as a solvent, and in particular, the same results were shown in terms of a sharp increase in ESR after 1,000 hours.

These other glycols having high boiling points in Comparative Examples 13, 14, and 15 have advantages in terms of a large length of a main chain or a side chain connecting two hydroxyl groups and a large size of a molecule and a large molecular weight as compared to those in diethylene glycol or triethylene glycol. Assuming that it does not affect the interpretation of the scope of the present invention, it is presumed that since compatibility between the solvent and the solute component of the electrolytic solution, compatibility with the conductive polymer, a swelling effect, or an action of stabilizing an interface between the conductive polymer and the dielectric during high temperature aging is changed depending on a difference in structure, and diethylene glycol and triethylene glycol have the most preferred structures, the heat resistance or high thermal stability (reliability) is excellent.

Table 4 shows results of examining a preferred content with respect to the entire solvent in a case where diethylene glycol or triethylene glycol was used. Diethylene glycol or triethylene glycol is preferably mixed with γ-butyrolactone having excellent low temperature characteristics similar to ethylene glycol. In addition, it is also preferable that a part of γ-butyrolactone is replaced with sulfolane having excellent high thermal stability to further improve the high-temperature reliability.

TABLE 4

Content of solvent of the present invention and results of heat resistance evaluation (rating of 80 V, 39 μF, 10 φ × 10.5 L)

| Comparative Example/ Example | Composition of electrolytic solution (Solute) isoeicosadienoic acid + DBU 15% Solvent composition (%) | | | | (DEG, TEG + GBL)% | Initial value ESR (mΩ) 20° C./−40° C. | Soldering heat resistance test Swelling (Average/ maximum) | ESR (mΩ) 20° C. | High-temperature reliability test 135° C. 1,000 hours Change in capacitance ΔC (%) | Δ ESR (%) 20° C. |
|---|---|---|---|---|---|---|---|---|---|---|
| | DEG | TEC | GBL | TNS | | | | | | |
| Comparative Example 16 | 100 | | | | (100%) | 12.0/14.2 | ○/○ | 52 | −0.3 | +433 |
| Comparative Example 17 | 10 | | 80 | 10 | (90%) | 13.2/14.7 | ○/Δ | 273 | −15.5 | +2070 |
| Example 1 | 30 | | 60 | 10 | (90%) | 14.4/15.7 | ○/○ | 114 | −13.8 | +790 |
| Example 2 | 55 | | 30 | 15 | (85%) | 14.2/14.8 | ○/○ | 20 | −0.2 | +139 |
| Example 5 | 70 | | 20 | 10 | (90%) | 13.0/14.6 | ○/Δ | 29 | −2 | +225 |
| Example 6 | | 70 | 20 | 10 | (90%) | 13.4/14.9 | ○/Δ | 39 | −2.3 | +295 |

An isoeicosadienoic acid and DBU were used as a solute in each of Examples 1 and 2 in the same composition and the same addition amount as those described above, but the compositions (DEG, TEG, and GBL) and concentration of the solute in each of Comparative Examples 16 and 17 and Examples 5 and 6 in the premix solvent were adjusted so that a ratio of the solvent from the premix solution of the solvent obtained by dissolving the solute and a solvent to be newly added was shown in the table.

There were no significant differences in the initial characteristics and the soldering heat resistance, but when the ratio of the solute in the solvent was more than 90 wt %, the viscosity of the electrolytic solution was increased, such that a variation in the electrical characteristics of the produced sample was large, and a variation in the impregnation property of the electrolytic solution was observed. The electrolytic solution having 100 wt % of diethylene glycol as the solvent in Comparative Example 16 has problems in that the viscosity is relatively larger than that of the mixed solvent (Examples 5 and 6) diluted with γ-butyrolactone, and variations in the initial capacitance of the electrical characteristics, the leakage current after the soldering heat resistance test, and ESR are larger than those of the other samples. On the other hand, as shown in the results of the high-temperature reliability test after the time has elapsed for 1,000 hours at 135° C. in Comparative Example 17, when a content of diethylene glycol is small, the effect of maintaining a low ESR is relatively small in the soldering heat resistance test or the high-temperature reliability test of the capacitor having a high rated voltage and having a feature that the glycol compound has a hydroxyl group, and these solvents have no remarkable effects. As a result of various studies, characteristic are the content of diethylene glycol and/or triethylene glycol which is the solvent used in the present invention is 30 wt %, and preferably in a range of 45 wt % to 80 wt %, with respect to the entire solvent, and the total content of diethylene glycol and/or triethylene glycol, and γ-butyrolactone contributing to improvement of solubility of the solute having a high dilution effect and improvement of low temperature characteristics is 80 wt % or more, and preferably 90 wt % or more. Sulfolane having a high withstand voltage and an excellent heat resistance is preferably used as a third solvent other than γ-butyrolactone, but the addition of the sulfolane is not an essential requirement of the present invention.

In the electrolytic solution of each of the examples, an essential requirement of the present invention is that a solute is an amine salt of long-chain dibasic carboxylic acid having 12 or more carbons, and the amine is a specific amine having a boiling point of 150° C. or higher, and when any one of components of the salt and the base satisfies the requirement, a specifically remarkable action and effect cannot be obtained by combination with the solvent of the present invention. In addition, here, the long-chain dibasic carboxylic acid as the acid component is not limited to an isoeicosadienoic acid of an acid component constituting the solute of each of the examples. In addition, the amine of the base is also not limited to diazabicycloundecene of each of the examples.

A solvent obtained by mixing diethylene glycol, γ-butyrolactone, and sulfolane with each other at a predetermined ratio (55 wt %:30 wt %:15 wt %) was used as a solvent, a solute composition in which either an acid component or a base component did not satisfy the requirement of the present invention was used as the comparative examples, a solute prepared with an acid and a base other than the isoeicosadienoic acid and diazabicycloundecene and satisfying the requirement of the present invention was used as the example to prepare an electrolytic solution containing the respective solutes, a sample of a conductive polymer hybrid aluminum electrolytic capacitor in which a capacitor element having the same rated voltage of 80 V as that in each of the comparative examples and the examples and having a nominal capacitance of 39 μm was filled with each of the electrolytic solution in each of the comparative examples and the examples was prepared, the initial characteristic, soldering heat resistance, and high-temperature reliability test at 135° C. were performed, and the results are shown in Table 5.

In each of Comparative Examples 18, 19, and 20, since the base component is diazabicycloundecene (DBU) included in the scope of the present invention, and the acid component includes phthalic acid ($C_6H_4(COOH)_2$) which is an alicyclic dibasic carboxylic acid having 8 carbon atoms, azelaic acid $HOOC(CH_2)_7COOH$ which is a dibasic carboxylic acid and has a small number of carbons (n=9), and monobasic borodisalicylic acid $(OC_6H_4CO)_2BNH_4 \cdot 1.5H_2O$ having 14 carbons, the acid component of the solute does not satisfy the requirement of the present invention. In addition, in Comparative Example 21, since the solute contains a salt of an isoeicosadienoic acid and triethylamine having a low boiling point, the requirement of the present invention is not satisfied. On the other hand, in Examples 7 and 8, a solute containing dodecanedioic acid having 12 or 20 carbons (1,6-DDA: $C_{12}H_{22}O_4$) or 12-vinyl-8-octadecenedioic acid (VDDA: $C_{20}H_{34}O_4$) which is a long-chain dibasic carboxylic acid instead of the isoeicosadienoic acid, and diazabicycloundecene (DBU) as the base is used. All of the solutes of the comparative examples and the examples were easily dissolved in the solvent used in the present invention in which diethylene glycol was used as the main component, but concentrations of the acid and the base were adjusted so that a pH of the dissolved electrolytic solution was in a range of 4 to 6.

and/or the rate of ESR increase in each of the comparative examples is larger than that in each of the examples. It could be appreciated that differences in the capacitance decrease rate and the rate of ESR increase at 135° C. after 1,000 hours in a state, where the rated voltage was applied, were remarkable, and in the case where the solute of the comparative example was used, the heat resistance was significantly inferior.

In addition, as the sample having a high withstand voltage rating, a capacitor having a size of 10 ϕ×10.5 L (unit: mm), a rated voltage of 200 V, and a capacitance of 6.8 uF was prepared. An attempt was made to prepare a sample of a conductive polymer hybrid aluminum electrolytic capacitor with a rating of 200 V and 6.8 μF in which only the electrolytic solution was changed to be used for each of the comparative examples and the examples with the same material and the same process as those of the material and the method for producing the capacitor with a rating of 80 V and 33 μF, except that a foil having a high purity of 99.97% was used as an anode foil, and a high purity and high withstand voltage anode foil having a foil withstand voltage of 530 Vf based on a formation voltage was used. The combination of the solvent and the solute of the electrolytic

TABLE 5

Change in heat resistance of polymer hybrid capacitor obtained by combining acid and base of solute

| Solvent composition | Comparative Example/ Example | Solute Acid | Amine (boiling point) | Initial value ESR (mΩ) 20° C./−40° C. | Soldering heat resistance test Swelling (Average/ maximum) | ESR (mΩ) 20° C. | High-temperature reliability test 135° C. 1,000 hours Change in capacitance ΔC (%) | Δ ESR (%) 20° C. |
|---|---|---|---|---|---|---|---|---|
| DEG 555 | Comparative Example 18 | PhA | DBU (261° C.) | 12.5 | Δ/X | 23.3 | −5.22 | +1200 |
| GBL 30% | Comparative Example 19 | AZeA | DBU (261° C.) | 8.2 | Δ/X | 89.1 | Experiment stopped in 500 hours | |
| TMS 15% | Comparative Example 20 | BSalA | DBU (261° C.) | 13.3 | Δ/Δ | 39.9 | −2.22 | +850 |
| | Comparative Example 21 | iEDA | TEA (89° C.) | 12.1 | X/X | 48.9 | Experiment stopped in 500 hours | |
| (Solute amount 15%) | Example 7 | 1,6-DDA | DBU (261° C.) | 10.8 | Δ/○ | 24.6 | −1.95 | +168 |
| | Example 8 | VDDA | DBU (261° C.) | 13.1 | Δ/Δ | 30.6 | −2.5 | +179 |
| | Example 9 | iEDA | DBA (159° C.) | 11.2 | Δ/○ | 35.5 | −3.2 | +153 |

ESR20° C. 100 kHz (mΩ)
DEG: Diethylene glycol
GBL: γ-Butyrolactone
TMS: Sulfolane
PhA: Phthalic acid
AZeA: Azelaic acid
BSalA: Borodisalicylic acid
iEDA: Isoeicosadienoic acid
1,6-DDA: 2-Butyloctanedioic acid
VDDA: 12-Vinyl-8-octadecenedioic acid
TEA: Triethylamine
DBU: Diazabicycloundecene
DBA: Dibutylamine Although there is no difference in initial characteristics between the comparative examples and the examples, in the soldering heat resistance test, the swelling of the capacitor solution of the capacitor attempted to be produced and the results of measuring the formation voltage of each of the electrolytic solutions are shown in Table 6.

TABLE 6

Electrolytic solution and formation voltage of product production with rating of 200 V

| Comparative Example/ Example | Solvent of electrolytic solution | | | | Solute | | Electrolytic solution Formation voltage Vs |
|---|---|---|---|---|---|---|---|
| | EG | DEG | GBL | TMS | BSaIA + TEA | iEDA + DBD | |
| Comparative Example 22 | | 30% | 60% | 10% | 10% | — | 237 |
| Comparative Example 23 | | 55% | 30% | 15% | 10% | — | 229 |
| Comparative Example 24 | 55% | | 30% | 15% | — | 15% | 357 |
| Comparative Example 25 | 35% | | 10% | 55% | — | 15% | 386 |
| Example 10 | | 30% | 60% | 10% | — | 15% | 452 |
| Example 11 | | 55% | 30% | 15% | — | 15% | 467 |

(Trial results of product with rating of 200 V and 6.8 μF)

The trial results of the conductive polymer hybrid aluminum electrolytic capacitor with a rating of 200 V using the electrolytic solution of Table 6 are shown in Table 7.

TABLE 7

Trial results of product with rating of 200 V (10 φ × 10.5 L, number of trials: 100)

| Trial product | Formation voltage of electrolytic solution | Defective rate in aging process (aging condition: 280 V 80° C. | Trial results |
|---|---|---|---|
| Comparative Example 22 | 252 V | Impossible to try due to low spark voltage | Impossible to try |
| Comparative Example 23 | 229 V | Impossible to try due to low spark voltage | Impossible to try |
| Comparative Example 24 | 345 V | Leakage current and short circuit defective rate 15% | Low yield and no evaluation of characteristics |
| Comparative Example 25 | 386 V | Short circuit defective rate 3% | Evaluate accepted product |
| Example 10 | 452 V | Defective rate 0% | All accepted |
| Example 11 | 467 V | Defective rate 0% | All accepted |

In Comparative Examples 22 and 23, in which the solvent composition of the electrolytic solution was the same as those in Examples 10 and 11 and the solute was changed to a triethylamine salt of borodisalicylic acid, the spark voltage was low, and when an aging voltage of 280 V was applied to the capacitor having a rated voltage of 200 V, in the aging inspection process after sealing in the production process of the capacitor, the leakage current was large to cause a short circuit defect, and thus, a capacitor having a 200 V rating could not be produced. In Comparative Example 25 in which the solvent composition disclosed in Comparative Example 24 and JP 2018-74046 A in which the diethylene glycol used in the present invention was changed to ethylene glycol among the solvents of Example 11 was used and ethylene glycol and sulfolane were mainly used as a mixed solvent while using the isoeicosadienoic acid and the diazabicycloundecene salt as the solute used in the present invention, the spark voltage was, surprisingly, lower by 20% than a case where diethylene glycol, γ-butyrolactone alone, or a mixed solvent of γ-butyrolactone and sulfolane was added. As a result of producing and evaluating a trial conductive polymer hybrid electrolytic capacitor having a rated voltage of 200 V, a yield in the aging process was low, and in particular, in Comparative Example 24, a sample for evaluation could not be produced. On the other hand, in Examples 10 and 11 in which the solvent, in which diethylene glycol, γ-butyrolactone alone, or a mixed solvent of γ-butyrolactone and sulfolane was added, was used, the spark voltage of the electrolytic solution was high, and the defective rate in the aging process was 0%.

In the aging inspection process shown in Table 7, among all of the accepted capacitors, the reflow heat resistance (3 times) of the samples (5) of the capacitor of Example 11 and the samples (5), accepted in the aging inspection of Comparative Example 25, were evaluated in the same conditions as those described above, and the results are shown in Table 8. In all of the samples, the swelling at the top of the capacitor was relatively low, and the changes in capacitance, leakage current, and ESR were relatively smaller than those of before the reflow. There was no large difference in the results of the soldering heat resistance test in Comparative Example 24 and Example 10.

TABLE 8

Results of reflow heat resistance evaluation of product with rating of 200 V (200 V, 6.8 μF, 10 φ × 10.5 L)

| Example/ Comparative | Initial characteristics (before reflow) | | | | Soldering heat resistance (characteristics after 3 times of reflow) | | | | | |
|---|---|---|---|---|---|---|---|---|---|---|
| | Capacitance (uF) | Leakage current 2 minutes | ESR100 kHz (mΩ) | | Swelling (mm) Average/ | Capacitance | Change in capacitance ΔC/Co | Leakage current 2 minutes | ESR100 kHz (mΩ) | |
| Example | 120 Hz | (uA) | +20° C. | −40° C. | maximum | (uF) | (%) | (uA) | +20° C. | −40° C. |
| Comparative Example 25 | 6.4 | 6.74 | 25.45 | 28.76 | Δ/X | 6.32 | −1.25% | 46.08 | 38.5 | 46 |
| Example 11 | 6.3 | 4.04 | 22.9 | 23.1 | Δ/Δ | 6.2 | −1.59% | 40.6 | 36.3 | 48.5 |

Temperature condition of soldering heat resistance test: peak temperature 250° C. (+245° C. 30 seconds) +230° C. 80 seconds Further, the samples (5) after 3 times of reflow were held in a high temperature oven at 125° C. in a state where a rated voltage of 200 V was applied, and the high-temperature reliability test was performed. The measurement results after the test time of 500 hours and 3,000 hours are shown in Table 9.

TABLE 9

Reliability test results of capacitor with rating of 200 V (200 V, 6.8 μF, 10 φ × 10.5 L)

| Example/ Comparative Example | Initial characteristics (after 3 times of reflow) | | | High-temperature reliability test @125° C. application of rated voltage of 200 V | | | | | |
|---|---|---|---|---|---|---|---|---|---|
| | Capacitance (uF) | Leakage current 2 minutes (uA) | ESR*1 (mΩ) | Change in capacitance ΔC/Co (%) | | Leakage current 2 minutes (uA) | | ESR*1 (mΩ) (ΔESR %) | |
| | | | | 500 Hr | 3000 Hr | 500 Hr | 3000 Hr | 500 Hr | 3000 Hr |
| Comparative Example 25 | 6.32 | 46.08 | 38.5 | −3.58% | −6.55% | 0.45 | 0.78 | 60.6 (+157%) | 180.6 (+469%) |
| Example 11 | 6.2 | 40.6 | 36.3 | −2.48% | −3.52% | 0.33 | 0.35 | 36.5 (+100%) | 48.1 (+132%) |

*1ESR measurement 20° C. 100 kHz

According to the results of the high-temperature reliability test shown in Table 9, in a case where the electrolytic solution in which ethylene glycol and sulfolane were used as a main solvent, a mixed solvent to which γ-butyrolactone alone was further added, was used, and an isoeicosadienoic acid and a diazabicycloundecene salt were used as the solute (example) used in the present invention, was used in a conductive polymer hybrid capacitor, in the high-temperature reliability test, the equivalent series resistance (ESR) was quickly increased, after 500 hours, the initial value (after the reflow heat resistance test) was increased by +57%, and after 3,000 hours, the initial value was increased by 368% (3.7 times), as compared to those in an electrolytic solution containing the same solute and a mixed solvent obtained by adding γ-butyrolactone and sulfolane to diethylene glycol as a solvent. This shows that the solvent containing diethylene glycol maintains a stabilizing action on the conductive polymer even at a high temperature of 125° C. or higher in a high withstand voltage region of a rating of 200 V.

In addition to the present examples, a trial conductive polymer hybrid aluminum electrolytic capacitor, in which diethylene glycol was changed to triethylene glycol, was produced, and the same effect was observed. In addition, the combination of an isoeicosadienoic acid and diazabicycloundecene is a specific example of a solute in which the isoeicosadienoic acid is a long-chain dibasic carboxylic acid having 12 or more carbons in total and the base component is an amine having a boiling point of 150° C. or higher, the combination is not limited thereto, the same effect can be obtained as long as it has the same physical properties as those as described above. For example, diazabicycloundecene was changed to tributylamine (boiling point: 217° C.), but the same effect was observed, and the stability at high temperature was higher than a case where ethylene glycol was used as a solvent. Such effect is a unique effect that can be obtained only in a case where a specific glycol, such as diethylene glycol which is used as a solvent, and a specific amine salt having a high boiling point, which is used as a solute, are combined, and the effect cannot be obtained with each of them. In addition, as described above, it was clarified that the same unique effect, obtained by the combination of the solvent and the solute used in a conductive polymer hybrid electrolytic capacitor with a rating of 80 V, also exhibited in a capacitor having a high withstand voltage of a rated voltage of 200 V. That is, the electrolytic solution used in the present invention is an industrially extremely useful technique because it improves high-temperature heat resistance of the conductive polymer hybrid aluminum electrolytic capacitor having a rated voltage over a wide range spanning from a low voltage to a high withstand voltage even with the same composition and simplifies the production process.

INDUSTRIAL APPLICABILITY

In the case of the electrolytic solution obtained by combining the specific solvent and the specific solute used in the present invention, since a conductive polymer hybrid aluminum electrolytic capacitor, that has a rated voltage over a wide range spanning from 63 V to 200 V, can be obtained, and it has not been previously known that the heat resistance and the long-term reliability in a high temperature environment of 125° C. or higher of the hybrid aluminum electrolytic capacitor can be improved without using a withstand voltage improver or a heat resistant stabilizer to be added in a case in which a water-soluble polymer such as polyethylene glycol (PEG) known in the related art (WO 2017/056447 A), mannitol, or sorbitol is used, it is an extremely useful technique for expanding the range of the rated voltage of the conductive polymer hybrid aluminum electrolytic capacitor and improving production efficiency.

What is claimed is:

1. A conductive polymer hybrid aluminum electrolytic capacitor having a capacitor element formed by winding an anode foil having an aluminum dielectric oxide film formed thereon and a cathode foil, with a separator interposed therebetween, the conductive polymer hybrid aluminum electrolytic capacitor comprising:
a conductive polymer layer formed on the dielectric oxide film and an electrolytic solution,
wherein the electrolytic solution contains a solute and a solvent, the solvent containing diethylene glycol and/or triethylene glycol and additionally, as a second solvent, γ-butyrolactone alone or a solvent mixture comprising γ-butyrolactone and sulfolane,
wherein the content of diethylene glycol and/or triethylene glycol is 30 to 90 wt % with respect to the entire solvent, with the remaining balance being γ-butyrolactone alone or a solvent mixture comprising γ-butyrolactone and sulfolane, and
wherein the solute contains a salt of a long-chain dibasic carboxylic acid (dicarboxylic acid) with 12 or more carbons and an amine with a boiling point of 150° C. or higher.

2. The conductive polymer hybrid aluminum electrolytic capacitor according to claim 1,
wherein the content of diethylene glycol and/or triethylene glycol and additional γ-butyrolactone as the second solvent, in the solvent is in a range of 45 wt % to 80 wt %;
wherein a total content of diethylene glycol and/or triethylene glycol and γ-butyrolactone is 80 wt % or more; and
wherein a content of γ-butyrolactone is 20 wt % to 55 wt %.

3. The conductive polymer hybrid aluminum electrolytic capacitor according to claim 1, wherein the solute contains a long-chain dibasic carboxylic acid with 12 and more carbons and an amine with a boiling point of 150° C. or higher.

4. The conductive polymer hybrid aluminum electrolytic capacitor according to claim 1, wherein the capacitor has a rated voltage in a range of 63 V to 200 V and a maximum guaranteed operating temperature of 105° C. or higher.

5. The conductive polymer hybrid aluminum electrolytic capacitor according to claim 1, wherein the capacitor has a rated voltage in a range of 63 V to 200 V and a maximum guaranteed operating temperature of 125° C. or higher.

6. The conductive polymer hybrid aluminum electrolytic capacitor according to claim 1, wherein the capacitor has a rated voltage in a range of 63 V to 200 V and a maximum guaranteed operating temperature of 135° C. or higher.

* * * * *